Patented Mar. 7, 1944

2,343,808

UNITED STATES PATENT OFFICE 2,343,808

NITROGENOUS CONDENSATION PRODUCTS

Paul Schlack, Berlin-Treptow, Germany; vested in the Alien Property Custodian

No Drawing. Application September 27, 1940, Serial No. 358,695. In Germany May 17, 1939

6 Claims. (Cl. 260—2)

This invention relates to new compositions of matter and more particularly to synthetic, nitrogenous, linear condensation products.

By action of diisocyanates on compounds with at least two functional groups reactive towards isocyanates such as oxy- or amino groups polyamide compounds are obtained which, when sufficiently polymerized yield valuable synthetic materials or synthetic resins. High molecular linear polyurethanes are obtained, when equivalent portions of diisocyanates are united with glycols, such as tetramethyleneglycol, decamethyleneglycol, xylyleneglycol or hydroquinone-$\beta\beta'$-dioxydiethylether. Polymeric ureas are formed in a similar manner with diamines. Similar or identical compounds are also obtained, when diurethanes are caused to react with glycols or diamines (U. S. A. patent application Ser. No. 277,948, filed June 7, 1939). These reactions are preferably carried out with urethane compounds in which the carbamic acid groups are esterified with an aromatic or enolic hydroxyl compound, especially with phenols (U. S. A. patent application Ser. No. 352,550, filed Aug. 14, 1940).

This invention has as an object the preparation of new and valuable compositions of matter, particularly synthetic, fiber forming materials.

A further object is the preparation of filaments, fibers, ribbons, and foils from these materials.

A further object is to form these materials by casting, dye-casting, injection molding or pressing into useful articles.

A still further object is the manufacture of lacquers, coating compositions and impregnations for textile fabrics.

These and other objects will become apparent from the following description.

It has been found that various novel polyurethane compounds are obtained, which in their properties may deviate more or less from those hitherto described with regard to hardness, melting point, solubility and chemical reactivity, when diisocyanates and diurethanes (especially when containing aromatic or enolic hydroxyl compounds linked in esterified form) are caused to react with bifunctional hydroxyl- or sulfhydryl compounds, in which at least one of the functional groups shows alcoholic character, whereas the other may be present in the form of a carboxyl group, an amino group or a monosubstituted amino group. Furthermore the compounds must be chosen in such a way that at least one bifunctional compound reacting in substantial, preferably stoichiometrical quantity contains preformed amide groups (carbonamide groups, urea groups, sulfamide groups, sulfonamide groups linked to carbonaceous radicals), whereby compounds containing urethane groups only are excepted. The amide groups may be built into open chains or may be constituents of heterocyclic rings being built into the chain. Moreover, they may not only be present in one of the two reactants, in the active (acylating) or in the passive (to be acylated) component, but simultaneously also in both of them. The new possibilities obtained hereby are various and a great variety is given in controlling the properties of polyamide compounds according to the intended use.

According to the present invention there are condensed diisocyanates or diurethanes with glycols, dimercaptans, amino alcohols, amino mercaptans, oxycarboxylic acids, mercapto carboxylic acids, of which components at least one contains performed amide groups. Polyamide compounds are thus obtained, which show urethane- or thiourethane groups besides the preformed amide groups introduced by the starting material. For each linking they display at least one of these ester groups, when, as it is generally the rule, two homogeneous components are caused to react with each other.

In principle one may work with more than two components. Besides glycols, oxycarboxylic acids or amino oxy compounds containing already an amide group, for instance a carbonamide group, there may be present furthermore simple glycols, oxycarboxylic acids or amino alcohols without such groups in the reaction mixture.

It is also within the scope of this invention, when dicarboxylic acids, for instance adipic acid, oxodibutyric acid or diamines, such as hexamethylene diamine and $\gamma\gamma'$-diamino dipropylether are present in part in the reaction mixture. Furthermore there may be added in part polyamide forming compounds, such as amino carboxylic acids or salts from diamines and dicarboxylic acids. Also these components or pair of substances may contain amide groups in the molecule (according to U. S. patent application Ser. No. 348,683, filed July 31, 1940).

Besides the bifunctional components there may be added in minor quantities also polyfunctional compounds, for instance polycarboxylic acids with more than two carboxyl groups or their reactive functional derivatives, furthermore, aminooxycarboxylic acids. Finally substances may be added for regulating the chainlength and influencing the electro-chemical character of the end-product, which under the given reaction conditions are capable to react on one side only, for instance monovalent alcohols or amines, such as dodecyl alcohol, octadecyl alcohol, cyclohexylamine, octodecyl amine, furthermore amino alcohols with tertiary amino groups or diamines with one tertiary amino group. Such substances may be added also during the condensation, if necessary, towards the end of the reaction. It is advantageous to work with two homogeneous reactive components.

Polymeric compounds of uniform or at least regular structure are then obtained, which for many purposes are more valuable than substances obtained by direct condensation of more than three components. In the latter case the course of reaction is very complicated, since the speed of reaction of the single components may vary considerably. Uniformly or regularly built substances differ more ro less considerably in important properties, for instance melting point and solubility, from the chemically isomeric mixed-condensates obtained when a mixture of the final hydrolysis products or their derivatives on which the polyamide in question seems to be based, is condensed.

Numerous methods may be employed for the synthesis of condensable components which are applicable according to the present invention. As far as the starting material for the production of isocyanates or diurethanes is concerned, the same diamino compounds with amide-like chain-interruption also come into question as described in U. S. patent application Ser. No. 348,683, filed July 31, 1940.

The conversion of these diamines into diisocyanates is accomplished in the usual manner by action of the hydrochlorides on phosgen in an indifferent solvent which practically has so high a boiling point that the carbamic acid chlorides initially formed are decomposed by boiling. Also the urethanes, as far as they are not built up from a starting material containing urethane groups are manufactured in a known manner, i. e. by the action of the diamines or their salts on halogen formic esters, for instance chloroformic acid phenyl ester, or as far as the aryl ester is concerned by the action of the free amines on the diarylcarbonate, the latter being preferably employed in excess.

In as far as isocyanate compounds are employed it is useful to choose simple components, since only such substances can be purified by the inexpensive method of distillation. Isocyanates of more complicated constitution are best obtained and worked up in solution, whereby the contents of the solution may be easily found out by action of substances yielding insoluble precipitation, such as aromatic amines.

In what various ways the components may be changed within the scope of the present invention can be seen from the following table. The invention is not limited to the types mentioned therein and to the substances described in these examples. Generally speaking the present invention relates to the manufacture of polyamides with urethane groups from components which already possess, at least partly, preformed amide groups.

TABLE

BIFUNCTIONAL COMPOUNDS REACTIVE WITH DIISOCYANATES OR DIURETHANES (I) Glycols and diurethanes (a) Compounds with amide groups in open chain.

(1)  HO—(CH₂)ₓ—NR—CO(A)—
     CO—NR—(CH₂)ₓ—OH $x$=at least 2, practically 3 or more, A=bivalent organic radical, may be =O.R=H or a monovalent, if necessary substituted hydrocarbon radical.

These compounds are obtained by the action of the dicarboxylic acids or their functional derivatives on amino alcohols, for instance oxalic acid, oxalic acid esters, adipic acid, adipic acid esters or adipic acid chloride. Suitable dicarboxylic acids are besides oxalic acid and adipic acid the following: malonic acid, glutaric acid, sebacic acid, oxodibutyric acid, oxalyl-bis-amino caproic acid, terephthalic acid, hexamethylene-bis-oxamic acid dialkyl ester.

(2) Dimercaptanes according to Formula 1 are obtained from the amino mercaptanes by acylation with dicarboxylic acids or from the alkyl amine halides, such as 3-chloropropylamine, and dicarboxylic acids with following exchange of halogen against sulfhydryl.

(3) Glycols and dimercaptanes with urea- or thiourea radicals.

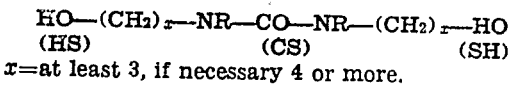
HO—(CH₂)ₓ—NR—CO—NR—(CH₂)ₓ—HO
(HS)                (CS)                (SH)

$x$=at least 3, if necessary 4 or more.

The compounds are obtained from the amino alcohols or amino mercaptanes by action of phosgent or carbonic esters or carbondisulfide or thiocarbonylchloride. The ureas are generally less valuable than the amides, since they have as a rule lower melting points. Instead of the simple compounds with phosgen or thiophosgen there may be placed an alkylene-bis-carbonyl group. It is possible, for instance, to combine amino alcohols or amino mercaptanes with a diurethane or with a diisocyanate, such as hexamethylenediisocyante. Components of considerably higher melting point are thus obtained.

As described above the mercaptanes may also be obtained by the way of alkylamine halides.

(b) Glycols (dimercaptanes with amide groups in heterocyclic rings).

(1) Cyclic ureas and thioureas.

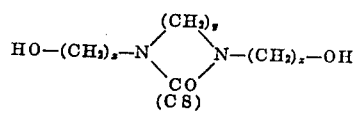

$x$=at least 2, $y$=2 or 3. These compounds are obtained by the action of primary amino alcohols on alkylene chlorides and following ring formation with phosgen or thiophosgen.

Dimercaptanes are obtained in a similar manner by way of the corresponding halogen alkyl ethylene diamines.

(2) Cyclic amides of the oxalic acid.

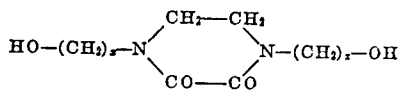

$x$=at least 2, preferably more than 3, obtained by the action of dioxyalkyl ethylene diamines on oxalic acid diphenyl ester or other oxalic acid compounds.

(3) 2,5-dioxopiperazine compounds.

(aa)
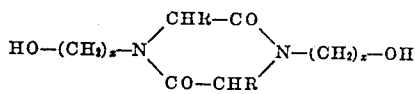

R=alkyl, $x$=2 or more, easily obtainable by reaction of the amino alcohols with the α-halogen fatty acids, esterification and cyclization of the amino esters or by the action of the amino alcohols on an aldehyde, especially formaldehyde and hydrocyanic acid, esterification of the nitrile and cyclization of the ester. The reaction proceeds as follows:

$$HO-(CH_2)_x-NH_2 + Cl-\underset{R}{\underset{|}{C}H}-COOH \longrightarrow$$

$$HO-(CH_2)_x-NH-\underset{R}{\underset{|}{C}H}-COOH + HCl$$

$$HO-(CH_2)_x-NH-\underset{R}{\underset{|}{C}H}-COOH + ROH \longrightarrow$$

$$HO-(CH_2)_x-NH-\underset{R}{\underset{|}{C}H}-COOR + H_2O$$

$$2HO-(CH_2)_x-NH-\underset{R}{\underset{|}{C}H}-COOR \xrightarrow{heated}$$

$$HO-(CH_2)_x-N\begin{array}{c}\overset{R}{\underset{|}{C}H}-CO\\ \\CO-\underset{|}{\underset{R}{C}H}\end{array}N-(CH_2)_x-OH + 2ROH$$

*Esterification and ring closure*

R=alkyl.

(bb)

$$HO-(CH_2)_x-C\underset{|}{H}\begin{array}{c}RN-CO\\ \\CO-RN\end{array}CH-(CH_2)_x-OH$$

$x=2$ or more, obtainable from α-amino acids in the usual way.

*Example.*—Di-β-oxyethyl-diketopiperazine.

(4) Glycols with oxazolrings.

$$HO(CH_2)_x-N-CH_2-CH-CH-CH_2-N(CH_2)_x-OH$$
$$\qquad\qquad\;\;|\qquad\;\;|\quad\;\;|\qquad\;\;|$$
$$\qquad\qquad\;\;C\!-\!-\!-\!O\quad O\!-\!-\!-\!C$$
$$\qquad\qquad\;\;\|\qquad\qquad\qquad\;\|$$
$$\qquad\qquad\;\;O\qquad\qquad\qquad\;O$$

$x=4$ or more. It is obtained by condensation of excess amino alcohols with butadiene dioxide and following reaction with diphenylcarbonate.

(5) Glycols (mercaptanes) with sulfo groups.

$$HO-(CH_2)_x-N-SO_2-R''-SO_2-N-(CH_2)_x-OH$$
$$(HS)\qquad\;\;|\qquad\qquad\qquad\;\;|\qquad\;\;(SH)$$
$$\qquad\qquad R'\qquad\qquad\qquad R'$$

R'=alkyl or substituted alkyl radical,
R''=bivalent organic radical, for instance trimethylene or phenylene.

These glycols are obtained from bivalent sulfo chlorides in a straight reaction, for instance by action of trimethylene disulfochloride or benzene disulfochloride on amino alcohols or amino mercaptanes. The mercapto group may also be introduced through ω-alkyl halide radicals. Ethane-disulfochloride cannot be used as component.

$$HO-(CH_2)_x-SO_2-NR'-R''-$$
$$\qquad\qquad\qquad\qquad NR'-SO_2-(CH_2)_x-OH$$
HS $\qquad\qquad\qquad\qquad\qquad\qquad\qquad\qquad$ SH R'=alkyl or substituted alkyl radical,
R''=bivalent organic radical,
$x$=two or more, preferably=3 or more.

Best obtainable by action of halogen alkyl sulfochlorides on diamines, for instance ethylene diamine, symmetrical dimethyl ethylene diamine, hexamethylene diamine with following exchange of the halogen against OH for SH.

II. *Oxy(mercapto)-carbonic acids*

(1) $\quad HO-(CH_2)_x-NH-CO-COOH$
$\quad\;\;(HS)$ $x=2$, better 3 or more.

Action of the amino alcohols or amino mercaptanes on excess oxalic acid esters and saponification of the oxamide acid esters thus formed.

(2) $HO-(CH_2)_x-NH-CO-(CH_2)_y-COOH$
$\;\;\;(HS)$ $x=2$, better 3 or more, $y=1$ or 3, better 4 or more. Obtainable by action of the amino alcohols on excess dicarboxylic acid esters and saponification of the amide esters thus formed.

(3) $HO-(CH_2)_x-NR-CO-$
$\qquad\qquad\qquad\qquad\qquad NR-(CH_2)_y-COOH$
$\;\;\;(HS)$ $x=2$, better 3 or more, $y=3$ or more. Such compounds are obtainable for instance by action of the urethane amino acids or urethane amino acid esters on amino alcohols or mercaptoalcohols, which, if necessary, are afterwards saponified.

(4) $\quad HO-(CH_2)_x-N\!-\!-\!-\!CO$
$\qquad\qquad\qquad\qquad\;\;|\qquad\qquad N-(CH_2)_y-COOH$
$\qquad\qquad\qquad R\overset{|}{C}H-CO$ $x=2$, better 3 or more,
$y$=at least 2, preferably 4 or more.

(III) *Aminooxy-(mercapto) compounds*

$$HNR-(CH_2)_x-CO-NR-(CH_2)_y-OH$$
$$\qquad\qquad\qquad\qquad\qquad\qquad\qquad\quad SH$$

$x$=at least 5,
$y=2$, preferably 3 or more.

Compounds of this kind are obtainable by a reaction of the amino carboxylic acid esters with excess amino alcohols or by the action of the amino acid chloride hydrochlorides on amino alcohols. Furthermore they can be obtained by coupling of the amino alcohols with formyl amino carboxylic acid chlorides and removing of the formyl group by boiling with alcohol containing sulfuric acid.

The afore-mentioned table is in no way exhaustive. It exhibits only the general types of compounds adapted for the present invention and shows furthermore by what general reactions they can be obtained.

If for instance in the table is stated, $x=2$, preferably 4 or more, it means, that with compounds of the type $x=2$ there are obtained polyamides which as a rule are not high polymeric or which possess moderate thermal resistance only. Components of the type=4 or more, however, yield more stable and more valuable compounds, the condensation degree of which may be increased considerably.

In the practical application of the reaction the components may be directly given together or melted together provided, the reaction is not too violent. If the latter is the case (with isocyanates) a solvent or diluent is necessary, which at the end of the starting reaction can be distilled off immediately. Hydrocarbons for instance and their halogen compounds are most suitable hereto, such as chloroform, tetrachloroethylene, benzene, chlorobenzene, o-dichlorobenzene, also ethers, such as dibutyl ether, dioxane, dimethyldioxane and stable esters, such as butyl propionate. Instead of the indifferent solvents or diluents or together with those there may be employed also dissolving compounds containing hydroxyl- or amide- or imide groups. These compounds do not yield substances which with isocyanates are stable at elevated temperatures. These are for instance phenols, such as phenol, n-cresol, xylenol, p-tertiary butylphenol and especially phenols negatively substituted by halogen, such as p-chloro-phenol or p-chloro m-cresol. Of the imide compounds there comes into question for instance carbazole.

The presence of phenols in the reaction mixture may influence the quality of the final product in a specifically optimal manner. Net-formations, which for instance may occur in the presence of urea groups with H on the nitrogen atom, do not set in after addition of phenol, or at least to a much smaller degree. Solvents may naturally be employed, when a violent starting reaction is not to be expected, for instance, when the reaction products melt only at high temperature being near to decomposition.

It is practical, especially when the reaction temperature lies above 150° C., to cut off atmospheric oxygen, for instance by conducting a stream of nitrogen current over the reaction mixture. Generally speaking the polyurethane amides are less oxidizable than linear polyamides, which are obtained by condensation of carboxyl compounds with amines.

In order to work up the melt, liberated if necessary from the solvent by a vacuum distillation, it may be extruded through nozzles in the form of a bristle or ribbon, preferably while cooling with water, if one does not prefer to spin the filaments directly from the primary melt. If solvents being solid at room temperature, for instance p-chloro-m-cresol, are used the solidified melt may be disintegrated and the solvent be removed with a non-solvent for the polymer, such as methanol or acetone. The relatively low polymeric compounds thus obtained may be further condensed by reheating in the molten state, preferably in vacuo, until a certain viscosity is attained.

When recondensing the primary reaction products, it is often advantageous to add small amounts, ⅟₃₀₀–⅟₅₀ mol. of a dicarboxylic acid, for instance adipic acid, sebacic acid, oxalyl-bis-amino caproic acid. (U. S. patent application Ser. No. 348,683, filed July 31, 1940.) Such admixtures suitably dosed facilitate the formation of a higher polymerization degree, provided the reactive groups in the reaction product are not lost by oxidation or other side-reactions.

Polymers, which before recondensation are to be precipitated, are practically treated in the presence of a small amount of a phenol, in order to maintain the reactivity.

Finally the primary reaction products may be dissolved in a solvent not used during the condensation, such as formic acid or acetic acid, and may be precipitated again from this solution by adding non-solvents or by discharging them into non-solvents. By a suitable choice of the quantitative proportion of solvent and precipitant, there may be accomplished simultaneously a purification or fractionation. The products according to the present invention are of wide use. Decidedly high polymeric compounds are valuable starting materials for formed structures. They may be worked up in the thermoplastic or plasticised state, from the melt or from solutions, for instance in phenols, formic acid, acetic acid, in some cases also alcohols into filaments, ribbons, bristles, foils, and films. Furthermore they may be formed by casting, dye-casting, injection molding or pressing in any desirable manner. Substances of a medium polymerization degree are suitable for the manufacture of lacquers and coating compositions or for impregnation, especially of textiles. Water soluble products may be used as protective colloids. Generally speaking they may be employed as auxiliary agents in the different branches of the textile industry and also in the related branches of chemical technology, for instance in the paper- and leather industries.

EXAMPLE I

To a solution of two mols 3-amino propanol in alcohol there is added, while cooling, one mol oxalic acid dimethyl ester in as little methanol as possible. The symmetrical di-3-oxypropyl-oxamide (F. P. 160° C.) is hereby formed in very good yield. To the diamide dissolved in m-cresol at elevated temperature there is given the corresponding amount of hexamethylene diisocyanate. The mixture is gradually heated up at 180° C., while stirring, and kept at this temperature for 3 hours, whereby atmospheric oxygen is excluded.

The solution after cooling is precipitated with dry acetone. The product which is thoroughly washed with acetone is remelted in a nitrogen atmosphere and heated up at 230° C. for 3 hours under 1 mm. pressure, whereby part of the cresol is distilled off. The polyurethane melts towards 195° C. The melt can be spun directly. A product being also spinnable is obtained, if the di-oxypropyl oxamide is suspended in benzene, part of the benzene for elimination of the last traces of humidity is distilled off and if the exactly calculated amount of hexamethylene diisocyanate in water-free benzene is added and the mixture boiled for 2 hours under reflux. The benzene is then distilled off and the residue still heated up at 240° C. for 3 hours in vacuo of 1–2 mm.

EXAMPLE II 1 mol hexamethylene diamine is added to excess oxalic acid diethyl ester (4 mols in the same volume of alcohol). The hexamethylene-bis-oxamic acid ethyl ester (F. P. 80° C.) is precipitated in colorless plates. 1 mol of it is dissolved in warm alcohol and there are added 2 mols of 3-amino propanol. The ωω'-di-γ-oxypropylhexamethylene-bis-oxamide (F. P. at about 195°) thus obtained in good yield is heated with the equivalent amount of hexamethylene-bis-carbamic acid diphenyl ester at 160–180° C. in a nitrogen atmosphere. After 3 hours the pressure is gradually reduced to 2 mm. and the temperature finally increased at 240° C. The temperature of 240° C. is kept 2–3 hours. The polyurethane amide thus obtained probably of the following formula —[CO—NH—(CH₂)₆NH—CO—O— 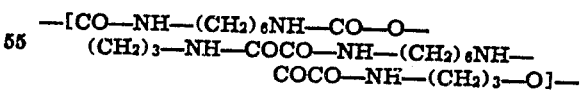
(CH₂)₃—NH—COCO—NH—(CH₂)₆NH—
COCO—NH—(CH₂)₃—O]— can be spun into filaments directly from the melt.

EXAMPLE III 3-amino propanol hydrochloride is shaken for 6 hours with the calculated amount of formaldehyde and potassium cyanide in the presence of ether thus forming 3-oxypropyl-sarcosine nitrile. This is saponified with methanolic hydrochloric acid into the methyl ester and the ester thus liberated is then heated at 160–170° C. for about 4 hours in phenol. It is cyclicized hereby to NN'-bis-3-oxypropyl-dioxypiperazine. This (1 mol) is dissolved in three parts of o-chloro phenol, traces of water are distilled off by adding a small amount of benzene. The exactly calculated amount of octamethylene diisocyanate (1 mol) dissolved in benzene is then added. After heating at 80° C. for one hour the temperature is first raised to 150° C., whereby the main amount of benzene distills off, and finally to 200° C., where it is kept for 3 hours. The polyamide is then precipitated by adding water-free acetone which contains 5% phenol.

By remelting of the product and heating in vacuo, if necessary by adding a small amount of dicarboxylic acids in quantities of for instance 1/300–1/50 mol calculated on the diisocyanate being used, the condensation product may be brought to still a higher polymerization degree. If the o-chlorophenol is replaced by the less acid phenol, the tendency for lower polymeric compounds prevails, because the o-chlorophenol is less reactive with isocyanates.

EXAMPLE IV

NN'-di-5-oxypentylurea obtained by action of 2 mols 1-amino-pentanol-5 on 1 mol diphenyl carbonate at 100° C. is dissolved in dry dioxane in a pressure vessel and there is added to the solution the calculated amount of tetramethylene diisocyanate. After the reaction is over the vessel is sealed and heated at 240° C. for 3 hours. The solvent is gradually blown off at this temperature and the product is heated finally still 1½ hours in vacuo (2 mm.) under a nitrogen current. The melt is then extruded in cold water through a slot. The polyamide is obtained in the form of a thick, elastic, very flexible ribbon.

EXAMPLE V

ε-bromo caproic acid chloride (obtained by action of the ε-bromo caproic acid on thionylchloride, the ε-bromo caproic acid being obtained from ε-amino caproic acid and nitrosylbromide) is coupled in alkaline solution with ε-amino caproic acid and the bromide is replaced by hydroxyl by boiling with potassiumformiate in 70% alcohol. The ω-oxycapronyl caproic acid is united with the equivalent amount of tetramethylene diisocyanate in tetrachloroethylene. After the initial reaction is over, the mixture is boiled for one hour and the solvent distilled off. The residue is gradually heated until 190–200° C. finally in vacuo (about 2 mm.). After 5–6 hours the product is spinnable from the melt.

EXAMPLE VI

N-methyl-3-chloropropyl amine hydrochloride is converted with sulfurylchloride in carbon tetrachloride into the N-sulfo chloride and this is coupled with an alkaline solution of ε-amino caproic acid. The N-γ-chloropropyl sulfamide-N'-ε-caproic acid is saponified by boiling with excess potassium formiate in 70% alcohol. The hydroxy acid thus obtained of the formula

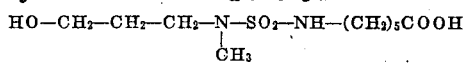

is caused to react with the equivalent amount of tetramethylene-bis-carbamic acid diphenyl ester by heating at 100–190° C. finally in vacuo. The temperature is raised so that 180° C. are reached within two hours. It is then heated another 3 hours at 180–190° C. By remelting of the reaction product liberated from the phenol by disintegrating in acetone the polymerization degree may be increased by further splitting off of phenol in vacuo.

EXAMPLE VII 1 mol trimethylene disulfochloride is coupled at 0° in aqueous solution with 3-amino propanol. The NN'-di-λ-oxypropyltrimethylene disulfamide thus precipitated is heated with tetramethylene-bis-carbamic acid diphenyl ester for one hour at 150° C., then gradually at 180° C. under reduced pressure and finally at 220° C. A tough resin is obtained which in solution, for instance glacial acetic acid, is useful for impregnating or seizing of textiles.

A product chemically very similar is obtained when 3-amino propanol in water is shaken with a solution of m-benzene disulfochloride in ether and the reaction product thus obtained is condensed with tetramethylene-bis-carbamic acid diphenyl ester.

EXAMPLE VIII 3-chloropropylamine is condensed in an alcoholic solution of methyl amine into di-(λ-aminopropyl) methylamine. The free amine is discharged into a 60° C. hot solution of excess diphenylcarbonate in benzene. Hereby the di-N-propylmethylamine-3-3'-carbamic acid diphenyl ester is obtained. By condensing the same for 4 hours with λλ'-dioxypropyl oxamide at 160–180° C. in a nitrogen current a condensation product is obtained, which is easily soluble in acids and which precipitates high molecular compounds with acid groups, such as dyestuffs and tanning matter. By alkylation with dimethyl sulfate the tertiary amino groups may be converted into quaternary ones. The aqueous solution of the methylated products also precipitates dyestuffs and tanning matter.

EXAMPLE IX

The NN'-di-λ-oxypropyl-ethylenediamine obtained by condensation of ethylene bromide with excess 3-amino propanol is converted by means of thiophosgen into the cyclic thiourea. By the reaction of thiourea with a solution of the equivalent amount of hexamethylene diisocyanate in dioxane and boiling of the reaction mixture for 3 hours a polyurethane is obtained, which becomes water-soluble by a treatment with alkylating agents, such as dimethylsulfate, benzylchloride or chloroacetic diethylamide. The aqueous solution precipitates tanning matter and dyestuffs with acid groups. By an alkali treatment the alkylated product becomes again water-unsoluble by splitting off the sulfur groups.

EXAMPLE X 3-amino propanol is acylated in aqueous 30% solution by shaking with terephthalic acid chloride in ether. The terephthaloyl-bis-aminopropanol (F. P. 187° C.) thus obtained is condensed with the equimolecular amount of hexamethylene-bis-carbamic acid xylenyl ester (from hexamethylenediamine and the chloro formic acid ester of technical xylenol) in xylenol for 8 hours at 180–220° C. and the polyurethane amide is finally precipitated with acetone. By remelting of the product purified with acetone and by an after-condensation shortly above the melting temperature during 4 hours at 2 mm. the degree of polymerization is increased.

A similar product of lower melting point is obtained from adipinyl-bis-amino propanol (obtained from adipinylchloride and propanol amine, F. P. 128° C).

EXAMPLE XI

Naphthalene tetracarboxylic acid dianhydride is condensed in di-chlorobenzene with 2 mols 5-amino pentanol-1. The bis-NN'-ω-oxypentyl-naphthalene-tetracarboxylic acid diimide thus obtained is mixed with octamethylene-bis-carbamic-p-chlorophenyl ester (obtained from the diamine with chloro formic acid p-chloro phenyl ester) by adding of 1/100 mol isooctylphenollithium (calculated on the diimid). The mixture is first heated for 1 hour at 150° C. by adding of 2 parts of p-chlorophenol and then for 9 hours at 190-200° C. The mass solidified after cooling is then disintegrated and liberated from the p-chlorophenol by extraction with acetone. By remelting in vacuo the polymerization degree of the product may be increased.

EXAMPLE XII 3-amino propanol is shaken in benzene with ε-amino caproic acid chloride-hydrochloride (prepared from the amino acid according to the method of Emil Fischer). ε-aminocaproyl-3-aminopropanol is formed hereby in good yield. The amine freed from the hydrogen chloride is condensed with tetramethylene - bis - carbamic acid diphenyl ester by heating for 10 hours at 180-240° C., at the end under 2 mm. The polyamide thus formed is spinnable into filaments directly from the melt.

EXAMPLE XIII 1 mol 3-mercaptopropyl amine sodium is caused to react in alcoholic solution with ½ mol oxalic acid diethyl ester. The dimercaptane isolated under exclusion of oxygen is heated at 180° C. with hexamethylene-bis-carbamic acid diphenyl ester and is kept at this temperature for 10 hours. After cooling the melt is dissolved in formic acid and the polyamide precipitated as yellow powder by means of acetone.

EXAMPLE XIV 3-amino propyl mercaptane sodium is caused to react in alcoholic solution with excess oxalic acid diethyl ester. The 3-mercapto propyloxamide acid obtained by saponification with alkali is condensed by heating for 8 hours into a polyamide at 120-190° C. with the equivalent amount of hexamethylene-bis-carbamic acid di-p-cresol ester.

EXAMPLE XV 2 mols of 5-amino phthalic acid are coupled in alkaline solution with sebacic acid into sebacinyl-bis-5-amino phthalic acid. The acid is converted by boiling with chlorobenzene into the dianhydride and this is condensed with 2 mols 3-aminopropanol-1 at 100-170° C., preferably o-dichlorobenzene is used as diluent. The sebacinyl-bis-5-aminophthalic acid-γ-oxypropylimid thus obtained is heated with the equivalent amount of hexamethylene-bis-carbamic acid-p-chlorophenyl ester at 200-210° C. After heating for 3 hours the chlorophenol thus formed is distilled off in vacuo and the temperature is thus regulated that the mass remains melted. All together the mass is heated for 8 hours. The reaction product is dissolved in formic acid and precipitated with chlorobenzene. Well adhesive coatings are obtained.

Instead of the carbamic acid ester the corresponding diisocyanate may be employed. In this case o-dichlorobenzene is employed as diluent and the reaction temperature is kept below 100° C. within the first hour. The mass is then boiled for 4 hours and the solvent distilled off. Also this product can be dissolved and reprecipitated from formic acid. By an after-condensation of the melt being liberated from solvents the polymerization degree may be increased.

A similar but higher melting product is obtained by employing adipinyl-bis-amino phthalic acid-γ-oxypropylimid instead of the sebacic acid compound.

EXAMPLE XVI

Lysine anhydride is converted into the dicarbamic ester by means of chloro carbonic acid phenyl ester. 1 mol of it is heated for 2 hours at 180° C. with 1 mol decamethyleneglycol. The phenol formed thereby is distilled off in vacuo. After further heating for 6 hours at 180-200° C. a tough resin is obtained which solidifies after cooling into a hard mass.

What I claim is:

1. A process for the production of nitrogeneous linear condensation products which comprises subjecting to condensation conditions a diurethane with a bifunctional compound of the formula:

HX—(CH₂)ₓ—NH—Y—NH—(CH₂)ₓ—XH wherein X is selected from the group consisting of O and S, x is at least 2, and Y is a bivalent radical selected from the group consisting of —CO—CO— and —CO—R—CO—, wherein R is a bivalent hydrocarbon radical.

2. Nitrogeneous linear condensation products obtained by the process set forth in claim 1.

3. The process as defined in claim 1, wherein said bifunctional compound is a glycol.

4. The process as defined in claim 1, wherein said bifunctional compound is a dimercaptan.

5. The process as defined in claim 1, wherein R is a bivalent aliphatic hydrocarbon radical.

6. The process as defined in claim 1, wherein Y is the oxalyl radical.

PAUL SCHLACK.